Jan. 22, 1963 S. A. WOHLER ETAL 3,074,163
POWER TOOLS
Filed July 7, 1961 4 Sheets-Sheet 2

INVENTOR. STANLEY A. WOHLER
BLAIR H. BAISLEY
WARREN LUNDY
BY
Frank H. Borden
ATTORNEY Jan. 22, 1963  S. A. WOHLER ETAL  3,074,163
POWER TOOLS
Filed July 7, 1961  4 Sheets-Sheet 3

INVENTOR. STANLEY A. WOHLER
BLAIR H. BAISLEY
BY WARREN LUNDY
ATTORNEY

INVENTOR
STANLEY A. WOHLER
BLAIR H. BAISLEY
BY  WARREN LUNDY

*Frank H. Borden*
ATTORNEY

United States Patent Office 3,074,163
Patented Jan. 22, 1963

3,074,163
POWER TOOLS
Stanley A. Wohler, Lansdale, Warren A. Lundy, New Hope, and Blair H. Baisley, Hatboro, Pa., assignors to Kellett Aircraft Corporation, Willow Grove, Pa., a corporation of Pennsylvania
Filed July 7, 1961, Ser. No. 122,496
11 Claims. (Cl. 30—180)

This invention relates to portable self-contained power tools, pertaining particularly to tools for air-sea rescue missions, and the like.

In this type of work, for purely illustrative instance, military or other personnel descending by parachutes or in capsules into the sea must be quickly freed from riser lines and webbing like harness in order that he may be quickly placed in the sling of a helicopter hoist, or the like, before his entanglements drag him under the surface. Efforts to effect such quick disentanglements in the past have taken the line of hand operated shears, or cutters deriving their power from an explosive. Such devices are slow and inefficient and are dangerous to all concerned.

In such emergencies it is imperative that all wires, cables, cords, loops and the like, of which there may be a plurality, be quickly and safely severed without danger to the entangled man and without danger to the operator, and the device used must be arranged to sever such, whether above or under the water. As will be clear, the field of use of the device is of much wider range, including, for illustrative instance, the severing of cables or the like in relatively inaccessible areas in the manufacturing or repairing of aircraft.

It is among the objects of this invention; to provide a portable self-contained power tool operable by one hand of an operator, and one which is automatically operative by the operator in a plurality of successive individual cutting operations without changes in the tool, which is purely pneumatic, is light in weight and relatively small in size, and avoids the use of explosive charges or two handed manipulations of shears or similar cutting devices; to provide a power tool in which a succession of spaced cutting strokes of great power can be effected with a succession of manual trigger pulses or actuations; and many other objects and advantages will become more apparent as the description proceeds.

In carrying out the invention in an illustrative organization, a cutting assembly is provided comprised of a fixed anvil and a spring biased piston mounting a cutting blade. A portable source of power is provided, such as a sealed capsule or cartridge of highly compressed gas, such illustratively as nitrogen at 2000 p.s.i., or higher, mounted on the tool and susceptible to piercing to release gas to the interior of the tool and thus arming the tool. Valving is provided for the tool, comprising a pressure valve controlling flow of gas into a cylinder behind the piston or shutting off such flow, and an exhaust valve communicating with the cylinder behind said piston, stopping flow out of said cylinder during the ingress thereto from said pressure valve, and also venting the gas behind the spring-biased piston to atmosphere after the cutting stroke has been completed. Movable means in the nature of a trigger is provided for actuating the respective pressure and relief valves in synchronism. The trigger is an element which can be operated by a finger or fingers of the tool operator, grasping the tool.

In the accompanying drawings forming part of this description:

The immediately following description is common to both forms of the illustrative tool. For simplicity the detailed organization now described is omitted from the showing of FIG. 4 which is primarily for the detailed showing of valving and porting.

Figure 1:
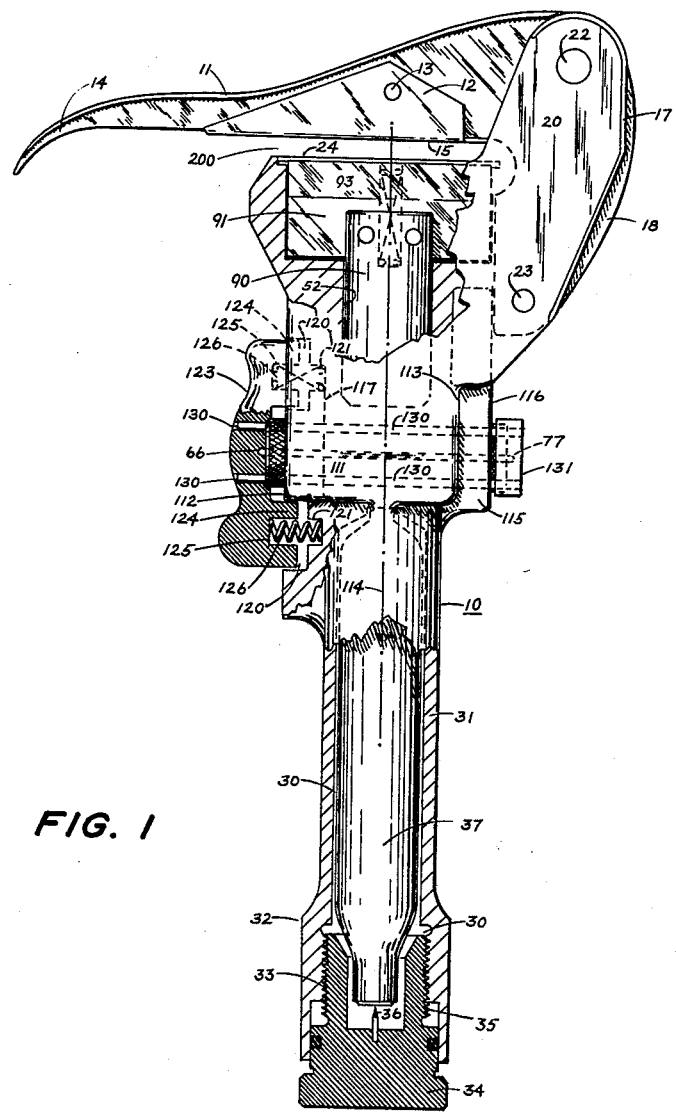
FIG. 1 represents a side elevation of an illustrative power tool according to the invention, partially in fragmentary section, with certain of the internal arrangements shown in dotted lines, and the valving of which is controlled by a trigger having linear motion.
Figure 2:
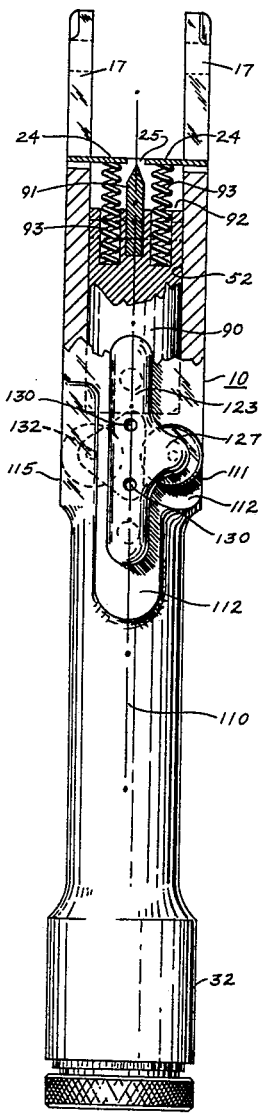
FIG. 2 represents a front elevation in partially fragmentary form of the tool of FIG. 1, with the hook portion removed for clarity.
Figure 3:
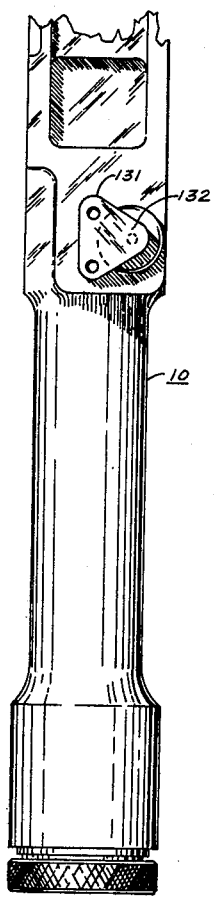
FIG. 3 represents a fragmentary rear elevation of the tool of FIG. 1, showing the rear stop assembly of the trigger.
Figure 5:
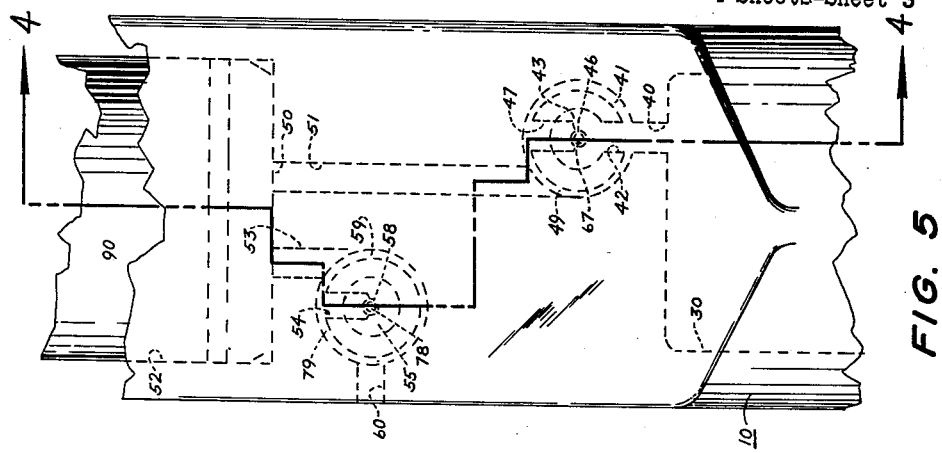
FIG. 5 represents a fragmentary diagrammatic view of the modified tool showing the duct and port arrangement with reference to the pressure and exhaust valve chambers, the gas supply chamber, and the cylinder for the blade-mounting piston.

Referring to FIGS. 1, 2 and 3, in general the tool comprises a housing or frame 10, which is usually generally cylindrical, rigidly mounting, at the working end of the tool, a laterally projecting hook element 11 having curved terminal line-guiding end 14. The housing and hook are preferably of stainless steel, as are most of the other components to be described. An anvil element 12 is mounted removably on the hook portion 11 by suitable means such as pin 13. The anvil element 12 is of hard brass or aluminum and has a planar face 15, generally normal to the longitudinal axis of the cylindrical housing and presenting toward the housing. While the rigid mounting of the hook portion 11—14 on the housing 10 can be effected in any desired manner it is presently preferred to provide a lateral projection on the housing comprising spaced parallel webs or cheeks 17—17, which are inwardly straddled by a reinforcing curved guard element 18 integral with hook element 11 and formed with parallel side faces 20—20. The whole assembly is held rigidly but removably together by dowel pins 22 and 23.

On the end of the housing 10, adjacent to the hook portion, a slotted plate or a pair of spaced parallel guard plates 24—24 are rigidly mounted in parallelism with the face 15 of the anvil portion 12 and define a blade slot 25, the median plane of which, normal to the plates 24—24 bisects and is normal to the anvil face 15. A power cylinder 52 has a slidable piston 90, adjacent to the hook portion, and the piston carries a cutting blade 91 operative through blade slot 25 relative to anvil 12.

The housing 10 is provided with various bores, apertures, ducts and chambers, to be described. At the passive end of the housing 10 opposite to the hook organization, a gas chamber 30 is provided in a terminal tubular portion 31. Tubular portion 31 is of such diameter as to comprise a handle for grasping by one hand of the operator. The extreme end of the tubular portion 31 is enlarged as at 32, and is internally threaded as at 33. An arming plug 34 is externally threaded as at 35, and is removably and sealably mounted in the enlarged end 32. The plug 34 inwardly mounts a concentric pointed piercing pin 36. With the plug 34 removed the gas chamber 30 is open to the atmosphere and permits the insertion and removal of a gas capsule or cartridge 37. The capsule is initially sealed and has a suitable lateral loose fit in the chamber 30 as to permit gas under pressure from the pierced end to flow about the capsule longitudinally thereof. When the fully pressurized capsule is inserted, the plug 34 is then mounted on the threads 33 and the end of the gas chamber is sealed at the rear or plug end. Initially of course the plug is only partially inserted and the piercing pin 36 is out of contact with the cartridge or capsule. Usually this situation maintains until the tool is to be used. At this juncture the operator screws in the plug 34 forcing the piercing pin 36 against and into the end of the capsule 37. This arms the tool and permits the pressurized gas to flow out of the capsule and fill the gas chamber 30. Suitable sealing gaskets such as O rings are provided as to tightly seal the plug 34 and the inner surface of the enlargement 32 to prevent leakage of the gas across the plug 34.

While, within the purview of the invention, the gas tube, capsule or cartridge 37 may be of any sort and be filled with any form of gas or air under useable pressure, it is preferred to use a gas which can be compressed safely and expeditiously to higher pressures than atmospheric air, or $CO_2$. Such a gas is nitrogen, capsules of which at 2000 p.s.i. are presently available. Higher pressures are in contemplation. With an illustrative nitrogen pressure of 2000 p.s.i. as many as eighteen successive, spaced cutting strokes of the tool of satisfactory power are available, in one model thereof which has been tested. This is usually more than enough to effect even a most difficult rescue mission. Usually, after the tool has been used for a single mission, the plug 34 is removed and the exhausted gas bottle or capsule is replaced in the gas chamber 30. This is an expeditious procedure. The anvil 12 can be quickly replaced. By removing the hook element 11 and the guard plates, the piston 90 can be axially removed and replaced for replacement of the cutting blade 93.

It will be understood as noted that all of the elements as so far described are common to both the preferred and the modified forms of the tool, and the only differences between these forms lies in the valving and trigger organizations.

It will be understood that the chambers, ports, apertures and the valving to be described can be arranged in various orders and dispositions, according to the desired space and weight characteristics of the tool, as will be described in further explanation of FIG. 1, et al. The basic valving organization is illustrated in enlarged scale in FIG. 4.

Referring to this figure the inner end of the gas chamber 30 communicates through fixed port 40, annular chamber 41 and port 42, with compression valve chamber 43. The latter is outwardly sealed by permanent plug 44, and communicates across a valve seat 45 with rod chamber 46. By suitable communicating passages comprised of bore 47, annular chamber 49, bore 51, annular chamber 69 and port 50 in pressure inlet 51, the latter is in constant communication with active or cutting power pressure cylinder 52. Pressure cylinder 52 is also in constant communication with relief or exhaust port 53 leading through annular chamber 59 and port 54 into relief valve chamber 55. The latter is outwardly sealed by a permanent plug 56 and communicates across a valve seat 57 with a rod chamber 58 communicating with exhaust port 60 leading out of the tool.

The pressure valve chamber 43 has a slidable ball cage piston 61, having on its inner end a stem 62 concentric with a compression spring 63 engaged between the plug 44 and the inner end of the ball cage piston, urging the piston toward the valve seat 45. The upper end of the piston 61 has a ball-receiving recess 64 within which is mounted a ball valve 65. In the normal relation of the parts the ball 65 is forced against the seat 45, by spring 63, sealing same against egress of pressurized gas from the pressure chamber 43. A rod 66, having a lower end of reduced diameter 67 in rod chamber 46, is slidable in sealed relation in the housing, with reference to the ball valve 65, and has an end surface 68 engaging said ball. The upper or outer end 70 of the rod 66 projects slightly from the housing in position to be impinged by and to move the rod axially in response to engagement thereof by a trigger lever 100, to be described. It will be understood that with no axial pressure or thrust on the rod 66 by the trigger, the ball valve 65 is forcibly seated and the pressure chamber is sealed thus elevating or extending end 70 thereof as it seats, and rod 66 is moved axially with the ball, a certain amount. Conversely overriding thrust on the extended end 70 moves the rod inward against ball 65 and unseats the latter against the force of spring 63, permitting pressurized gas to flow across seat 45 into rod chamber 46.

Relatedly exhaust valve chamber 55 has a slidable ball cage piston 72 having an inner stem 73 concentric with compression spring 74, compressed between the plug 56 and the inner face of the piston 72. The outer or upper end of the cage piston 72 has a ball-receiving recess 75 within which is mounted ball valve 76. In the normal relation of the parts the ball 76 is forced against the seat 57 by spring 74, sealing same against outward flow of pressurized gas from the exhaust valve chamber 55. A rod 77, having an end of reduced diameter 78 in rod chamber 58, and an abutment end 80, is slidable in sealed relation in the housing, with reference to the ball valve 76. The outer or upper end 81 of the rod 77 projects slightly from the housing in position to be impinged by and to move the rod 77 axially in response to engagement thereof by the trigger lever 100 to be described. It will be understood that the trigger lever 100 is biased in such manner toward a primary normal position that when not under predetermined manual pressure or actuation to a secondary position, to be described, the lever rests against and pushes downwardly on the rod 77 so that the ball 76 is forcibly unseated against the force of spring 74 sufficiently far as to continuously vent the exhaust chamber 55 to atmosphere (or water).

It will be understood therefore that in the normal primary unactuated or untriggered biased relation the pressure chamber is always closed and the exhaust chamber is always vented or open.

It will be clear that with slight changes in the various communicating passage arrangement the entire exhaust valve assembly as described can be reversed in the housing without modification, although such reversal requires a modified trigger arrangement. As will be explained this reversal is just what has been done in FIG. 1.

The active or cutting pressure chamber or cylinder 52 as briefly noted contains a slidable piston 90, the outer face of which mounts the sharpened cutting blade 91, disposed between the guard plates 24—24 in the slot 25. The cutting blade 91 is axially protuberant beyond the face 92 of the piston 90 and is mounted for removal and replacement. Compression springs 93—93 are compressed between the piston 90 and the inner surfaces of the guard plates 24—24, respectively. With no dynamic pressure in the cylinder 52 the piston 90 is forcibly held in retracted position by springs 93—93 and the cutting blade 91 is withdrawn within the slot 25 so as not to extend beyond the plane of the guard plates 24—24.

Figure 4:
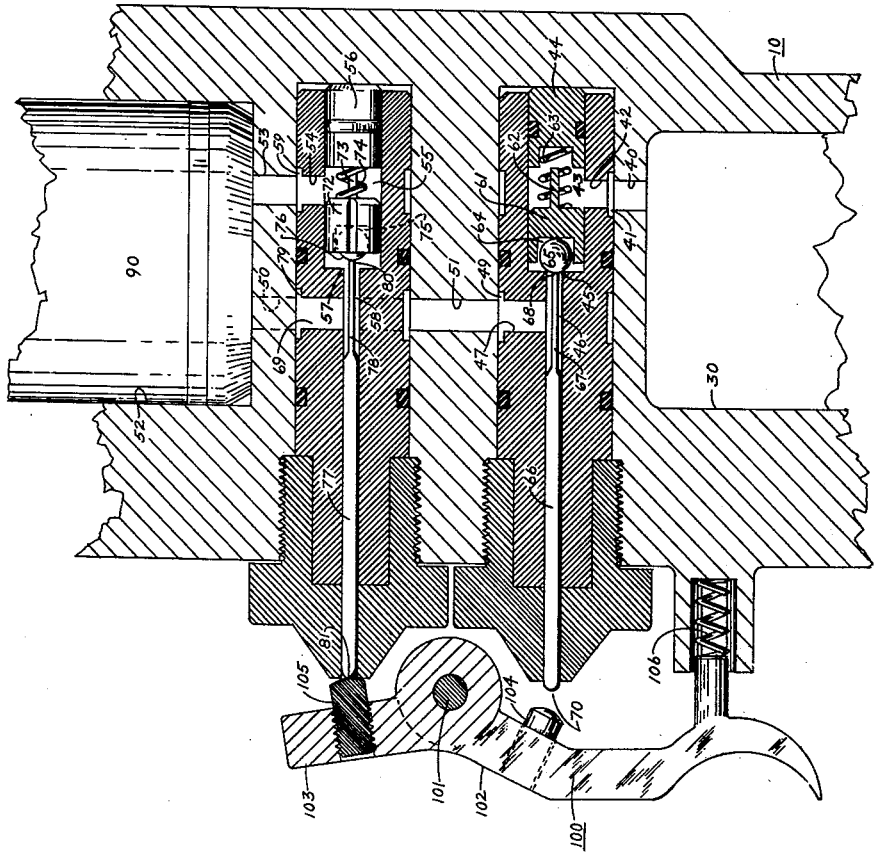
FIG. 4 represents a fragmentary transverse oblique section through the tool, taken on line 4—4 of FIG. 5, showing illustrative valving, and the rod arrangement controlling the valving, in a modification of this portion of the tool shown in FIG. 1, and in which the trigger control is a rocking lever.

For controlling the tool, in the FIG. 4 configuration, a triggering lever 100 is provided, pivoted to the housing or frame at 101, and comprising activating or trigger arm 102, and venting arm 103. Arm 102 generally overlies the end 70 of rod 66 and mounts an adjustable stud 104 for the actual contact with said rod. Arm 103 generally overlies the end 81 of rod 77, and mounts an adjustable stud 105 for the actual contact with said rod. A spring bias 106 extends between the housing or frame 10 and the lever 100, urging arm 102 away from rod 66, and of such loading as to force stud 105 on arm 103 against rod 77 as to move the latter axially to unseat the ball 76 and to hold it unseated, to vent the exhaust chamber 55 and the active shearing cylinder 52. As noted this permits the piston 90 to effect its full and rapid retraction in cylinder 52 under the force of springs 93—93.

The tripping lever and rod arrangement is such that whenever in the use of the tool the operator exerts manual pressure on the lever by compressive force against the arm 102, the lever swings in a continuous movement between its primary biased position and a secondary activated position. However, the first portion of the movement releases the rod 77 from the thrust of the stud 105 in arm 103, and under the force of the spring 74 the ball 76 seats and the rod 77 rises. This closes the exhaust communication with cylinder 52 before gas under pressure is permitted to enter behind the cutter blade-carrying piston 90 in the cylinder 52. This may be designated as the primary portion or phase of the first, counter-clockwise motion of the lever 100. Continued motion of the lever 100 in what may be designated as the secondary portion or phase of the first lever motion, brings the abutment or stud 104 against the end of the rod 66 forcing same inwardly, and unseating ball valve 65, permitting pressurized gas flow through the various communications into pressure cylinder 52 behind the piston 90, forcing the blade-carrying piston through a high speed travel wherein the blade passes through the slot 25 and across the space 200 against the anvil 12 with a sharp cutting stroke.

As soon as pressure from the finger of the operator against lever arm 102 is released, or so diminished that the spring 106 becomes effective, the lever rocks back in a second, continuous clockwise movement from its activated secondary position to its primary biased normal position. In the first or primary phase of such movement the stud 104 on arm 102 releases the pressure on rod 66, permitting the ball valve 65 to snap shut, elevating rod 66, and closing the pressure valve chamber 43, thus shutting off the communication thereof with the cylinder 52. Then in a secondary portion or phase of such second movement, the stud 105 of arm 103 impinges against the end 81 of the rod 77, unseating ball valve 76, opening the exhaust valve chamber 55 to venting to atmosphere and exhausting the gas in the cylinder 52 to the venting exhaust valve chamber 55, as piston 90 is forced inwardly by its springs 93.

Efficient and of as small size and light weight as s the form of the invention shown in FIG. 4, it will be seen that the lateral misalignment of the parallel pressure valve chambers, with the respective valve operating rods in parallelism terminating in the same side of the housing, necessitates perhaps undue enlargement of the housing, while also necessitating the use of a trigger device of the lever type movable in angular motion. While for many purposes this is not objectionable the valve assembly and triggering mechanism shown in FIGS. 1, 2 and 3 is preferred. In this, like parts common to these figures and to FIG. 4, have similar designations, whereas those peculiar to FIGS. 1, 2 and 3 are separately identified.

Referring to the latter figures, the housing 10 in minimal spacing of its axial center from a median longitudinal plane bisecting the slot 25 between guard plates 24—24, indicated by the dash and dot line 110 in FIG. 2, has a pressure-valve chamber housing 111, of axial extent toward the trigger side of the tool. This housing 111 extends from a planar front face 112 inwardly to termination at 113 in spaced relation to an axial longitudinal plane normal to plane 110, indicated by dash and dot lines 114 in FIG. 1. This pressure-valve chamber-housing 111 contains all of the pressure valve components as shown in FIG. 4, and the rod 66 thereof extends therefrom through the plane front face 112. The housing 10 in similar minimal spacing of its axis from the plane 110, has an exhaust-valve-chamber-housing 115 on the other side of said plane 110 from the pressure chamber housing 111. This extends inwardly from a planar rear face 116 to termination at 117 in spaced relation to said plane 110. The exhaust chamber housing 115 contains all of the exhaust valve components shown in FIG. 4, but in inverted order so that the rod 77 thereof extends from the rear face 116. The first mentioned planar front face 112 has a pair of parallel-walled recesses 120—120 in longitudinal transverse alignment merging inwardly into spring anchoring recesses 121—121. A longitudinally aligned trigger bar 123 has downward or inward guiding extension lugs 124—124, guided and slidable in the recesses 120, and each has a spring anchoring recess 125—125. The trigger bar 123 has a transverse web portion 127 extending laterally of the bar to overlie the pressure valve control rod 66. Compression springs 126—126 engage respectively in the registering pairs of opposite spring recesses 121—125, and urge the bar 123 outwardly of the front face 112 and into spaced relation to the end of the control rod 66. Parallel slide rods 130—130 anchor forwardly in the trigger bar and extend through the housing to projection through the rear face 116 thereof, and anchor rearwardly in a stop element 131. The latter incorporates a laterally extending web 132 overlying the exhaust valve control rod 77. The stop element 131 is adjustable on the rods 130—130 to a point at which the outward urge of the springs 126 against the trigger bar 123 holds the web 127 thereof in proper spaced relation to the end of control rod 66, while the web portion 132 of the stop portion 131 engages and holds the exhaust valve control rod 77 inwardly for venting the exhaust pressure.

The trigger bar 123 is outwardly contoured to facilitate gripping by the operator, and the housing is provided with the recited ducts, ports, passages and the like as to establish the same communications from the source of gas pressure into the pressure valve chamber, and from the pressure valve chamber into the working cylinder, and from the working cylinder into the exhaust valve chamber to entrapment or venting as the exhaust valve is operated.

It will be seen, however, that the trigger bar 123, with rods 130—130, has linear motion. This facilitates the manual control of the trigger. The operation is exactly the same as has been described of FIG. 4, in that with the cutter blade and its mounting piston retracted, and the parts in their neutral or passive attitudes, pressure on the trigger bar and a continuous movement inward thereof through the slide rods 130—130 moves the stop element 131 outwardly. This movement first moves the web 132 relative to the exhaust control rod 77 to permit the exhaust valve to close, and secondly brings the web 127 of the trigger bar into forcing abutment against the end of control rod 66 to depress the latter and open the pressure valve to incidence of the pressurized gas against the piston 90 in the working cylinder 52. This is against the force of the increasingly loaded compression springs 126—126. Upon release of the trigger bar by the operator, the springs 126—126 expand and force the trigger bar outward, first releasing the pressure valve control rod 66 to shut off the pressurized supply to the working cylinder, then to impose the web 132 forcibly against the end of exhaust valve control rod 77, opening the working cylinder 52 and the exhaust valve to atmosphere.

In operation, in an air-sea rescue mission, for instance, the operator screws in plug 34, if not previously accomplished, piercing the pressurized gas capsule and permitting pressurized gas to flow into the pressure chamber 43. This arms the tool. At this time, necessarily, the piston and its cutting blade have been retracted, and the established clearance 200 between the guard plates 24—24 and the anvil 12 maintains. In the usual case this clearance is just that which will freely admit any probable thickness or diameter of any shroud lines, webbing, steel cables or the like, while precluding admission of the fingers of the operator. The operator, swinging the tool in his fingers, slides the hook end 14 across the person or object bearing the harness or straps, until one or more of the severable objects slides across the hook into the clearance 200. At this juncture the operator causes his fingers to compress the trigger, thus initiating the practically instantaneous sequence of events previously described. This effects a powerful severing cut by the blade carried on the piston, against the anvil, severing any intermediate material therebetween. The cutter blade remains in its extended severing position against the anvil until the operator releases the trigger. In rapid sequence thereafter the input of gas to the working cylinder stops, the gas in the working cylinder is exhausted, the cutter blade is retracted, and the tool is ready for another triggering action. A plurality of successive such severing cutting actions is available from a single charge of the compressed gas.

Figure 6:
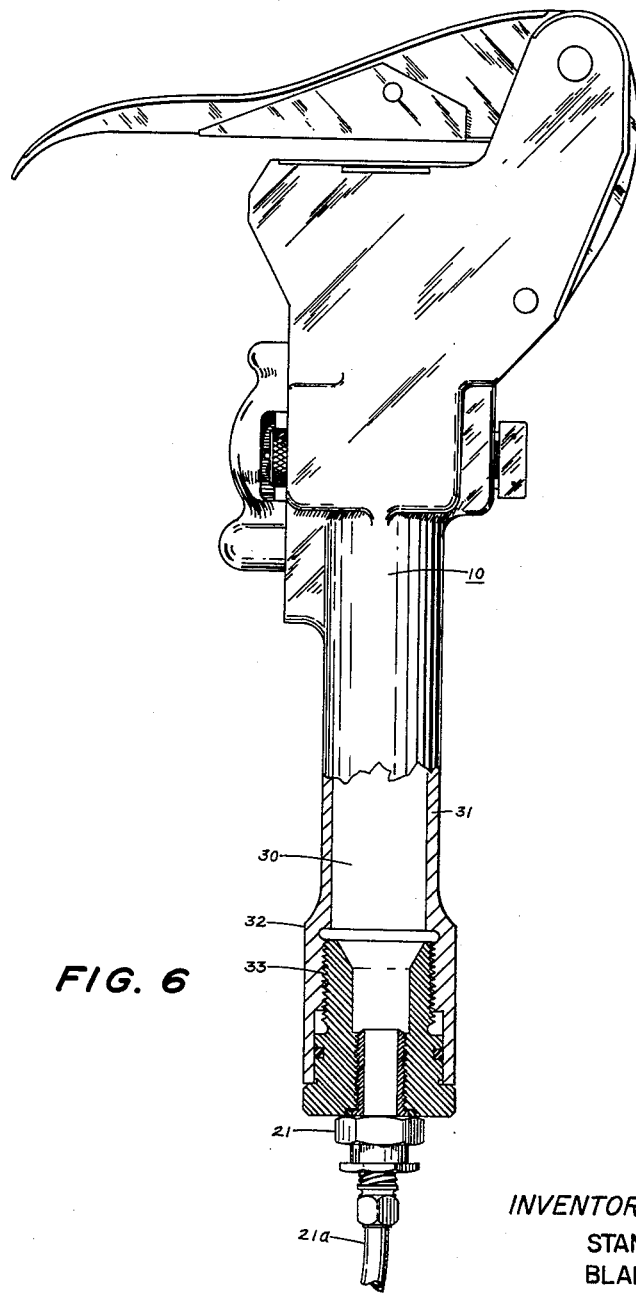
FIG. 6 represents a side elevation of the power tool, partially broken away to show a modified form of plug coupled to a conduit supplying gas under pressure from a source extraneous of the tool, communicating with the gas chamber of the tool.

While for compactness and portability the self-contained power tool as described may be preferred, the inserted gas capsule is not essential to the operation of the tool, and a separate source of gas under pressure may be used by a simple modification of the charging plug 34. As shown in FIG. 6 the charging pin in the plug is removed and an axial threaded aperture substituted. Into this aperture is threaded a fitting 21. To the outer end of this fitting a conduit 21a is attached leading to a source of compressed gas (not shown). This effectively charges the gas chamber 30 with gas under pressure, and enables the operation of the tool according to the previous description.

The small size, light weight, and portability of the tool, plus its tremendous cutting power, will be apparent, as will the fact that other uses of the tool are contemplated. Thus, it is available in any corners or hard-to-reach areas, or in situations where previously it has been necessary to provide separate tools and anvils to bring a tool to bear on particular work.

While a preferred organization has been disclosed, it will be obvious that many and various changes, modifications, and alternatives may be resorted to without departing from the spirit and principles of the invention, as recited in the appended claims. For instance it will be clear that the particular valving and the operation thereof is illustrative and many other forms of valving may be resorted to.

We claim as our invention:

1. A portable power tool comprising a housing, a gas chamber defined by the housing for communication with a supply of pressurized gas, an anvil on the housing, a cutting element movable toward and from said anvil, piston means mounting said cutting means, a working cylinder in said housing in which said piston means is movable, forcing means effective to urge said piston means in one direction in said cylinder, first controllable means in said housing leading outwardly of the housing controlling the venting of said cylinder behind said piston, second controllable means within the housing between said gas chamber and said cylinder controlling the flow of gas from said chamber into said cylinder behind said piston means, spring-biased trigger means movable between a normal biased primary position and a secondary actuated position, said trigger means upon actuation from its normal primary position to its secondary position synchronously actuating said first controllable means closing said venting means and actuating said second controllable means to permit flow of pressurized gas from said chamber into said cylinder behind said piston forcing the latter in the other direction in a severing stroke of said cutting means relative to said anvil, said trigger means upon release and biased movement into its primary position synchronously actuating said second controllable means precluding entry of gas into said cylinder and actuating said first controllable means venting said working cylinder.

2. A portable power tool as in claim 1, in which the housing mounts a replaceable pressurized gas capsule powering or energizing said gas chamber.

3. A power tool comprising a housing, a working cylinder in said housing, a piston slidable in said cylinder, a cutter blade mounted on said piston, an anvil mounted on said housing in juxtaposed relation to said cutter blade, resilient means operative on said piston to move same inwardly in said cylinder to retract said cutter blade relative to said anvil to establish a clearance to admit an element to be severed, a gas chamber in said housing, pressure valve means in the housing, exhaust valve means in the housing, trigger means on said housing operative relative to both of said valve means in synchronous actuation, said pressure valve means communicating with said gas chamber and with said cylinder, and said exhaust valve communicating with said cylinder and with atmosphere.

4. A power tool as in claim 3, in which said gas chamber is a closable chamber receiving a disposable cartridge of compressed gas, with means for piercing said cartridge for arming the tool.

5. A power tool as in claim 3 in which the gas chamber is disposed at one end of the housing and the portion of the housing defining same is of such minimal diameter as to function as a handle for the tool to be grasped by an operator while also contacting said trigger means.

6. A power tool as in claim 3 in which the gas chamber is externally energized.

7. A power tool comprising a housing having a longitudinal axis, a hook mounted toward one end of the housing extending transversely of said axis, anvil means mounted on said hook normal to said axis, a working cylinder in said housing, a piston slidable in said cylinder, a cutter blade mounted on said piston in juxtaposition to said anvil means, means biasing the piston in one direction to withdraw said cutter blade from contact with said anvil means and to establish a line-receiving clearance between said blade and said anvil means, a gas chamber for pressurized gas in the housing, pressure valve means in the housing the input of which is in constant communication with said gas chamber and the output of which is selectively cut-off from, or is incident on said cylinder behind said piston, exhaust valve means in said housing the output of which is in constant communication with an atmospheric vent, and the input of which is selectively cut-off from or is in communication with said cylinder behind said piston, and manual means for actuating said pressure valve means and said exhaust valve means in synchronism.

8. A power tool as in claim 7, in which each valve means comprises a valve seat, a spring pressed ball valve engageable with the seat, and an actuating rod is movable to unseat the ball valve.

9. A power tool as in claim 8, in which the manual means is operative relative to both of said actuating rods.

10. A power tool as in claim 8 in which both of said actuating rods extend laterally of the housing on the same side thereof, and said manual means comprises a rocking lever operative relative to both of said rods.

11. A power tool as in claim 8, in which said rods extend in respectively opposite directions on opposite sides of the housing, and the manual actuating means comprises a linearly movable element slidable on the tool for actuating one of said rods and a stop element mounted on the linearly movable element for actuating the other of said rods.

References Cited in the file of this patent
UNITED STATES PATENTS

| | | |
|---|---|---|
| 2,385,419 | Matulich | Sept. 25, 1945 |
| 2,714,250 | Twedt | Aug. 2, 1955 |
| 2,722,740 | Hubbard | Nov. 8, 1955 |
| 2,863,214 | Szappanyas | Dec. 9, 1958 |